United States Patent [19]

Vamvakas

[11] 4,176,067
[45] Nov. 27, 1979

[54] LABEL ACCUMULATOR AND CAUSTIC SEPARATOR

[75] Inventor: Michael Vamvakas, Rocky River, Ohio

[73] Assignee: Niagara Bottle Washer Mfg. Company, Cleveland, Ohio

[21] Appl. No.: 920,238

[22] Filed: Jun. 29, 1978

[51] Int. Cl.² .......................................... B01D 33/06
[52] U.S. Cl. ................................. 210/256; 210/297; 210/298; 210/326; 210/396; 210/402
[58] Field of Search .............. 210/255, 256, 261, 297, 210/298, 319, 326, 327, 333 R, 393, 396, 402

[56] References Cited

U.S. PATENT DOCUMENTS

| 406,158 | 7/1889 | Bardy | 210/396 X |
|---|---|---|---|
| 1,044,844 | 11/1912 | Argall | 210/319 X |
| 1,201,014 | 10/1916 | Boudwin | 210/298 |
| 1,408,653 | 3/1922 | Stiefel | 210/297 X |
| 1,731,193 | 10/1929 | Decker | 210/402 X |
| 1,967,070 | 7/1934 | Walker | 210/327 |
| 1,979,383 | 11/1934 | Gruetter | 210/297 |
| 2,414,176 | 1/1947 | Smith et al. | 210/298 X |
| 2,650,710 | 9/1953 | Stehling | 210/402 X |
| 4,106,980 | 8/1978 | Seifert et al. | 210/402 X |

FOREIGN PATENT DOCUMENTS 141971 6/1903 Fed. Rep. of Germany ........... 210/393

Primary Examiner—Robert H. Spitzer
Attorney, Agent, or Firm—Baldwin, Egan, Walling & Fetzer

[57] ABSTRACT

An apparatus is presented for separating loose paper pieces from a bath of caustic soda, such as is ejected from a bottle washing machine including a housing having a reservoir in its upper portion, the reservoir having finely perforated bottom walls sloping toward the center where there is an elongated opening. An elongated helical screw conveyor is provided in the housing spaced below and parallel to the elongated opening with a perforated conveyor sleeve closely surrounding the conveyor on the bottom and sides leaving an open top which communicates with the paper coming down from the upper reservoir. Two cylindrical perforated drums are mounted in the housing on axes parallel to the screw conveyor and on opposite sides of the center of the housing. These drums may be rotated from time to time as set forth. A paper-chopping apparatus is provided at the end of the conveyor which discharges paper outside of the housing. Caustic soda is collected in the bottom of the housing and may be pumped back to the bottle washing machine.

5 Claims, 6 Drawing Figures

LABEL ACCUMULATOR AND CAUSTIC SEPARATOR

BACKGROUND OF THE INVENTION

There has long been a need for an apparatus to cooperate with a bottle washing machine having a plurality of washing tanks, so that at the end of a washing cycle, the mixture of caustic soda and labels removed from the bottles may be passed through a label accumulator and caustic separator so as to remove all of the labels from the mixture and return the caustic soda substantially unaltered to the washing machine tank again.

An object of the present invention therefore is to provide such an apparatus which can take the tanks of the bottle washing machine one at a time and pass the contents through the label accumulator and caustic separator of this invention and then return the caustic soda back to the washing machine tank.

Another object of the present invention is to provide such an apparatus including a housing having a reservoir in the upper part of the housing into which may be pumped a mixture of caustic soda and loose paper pieces of the labels with the reservoir having a perforated bottom through which the caustic soda may be drained so that the pieces of paper are finally collected in the reservoir and later passed downwardly through intermittingly rotating drums to an elongated helical screw conveyor which delivers the pieces of paper through a paper chopper to a point outside of the housing. The caustic soda may be then transferred by pump from the lower part of the housing back to the washing machine tank.

Other objects and advantages of the present invention will be apparent from the accompanying drawings and description and the essential features thereof will be set forth in the appended claims.

BRIEF DESCRIPTION OF THE DRAWINGS

FIG. 4 is a sectional view taken along the line 4—4 of FIG. 3; while

Figure 1:
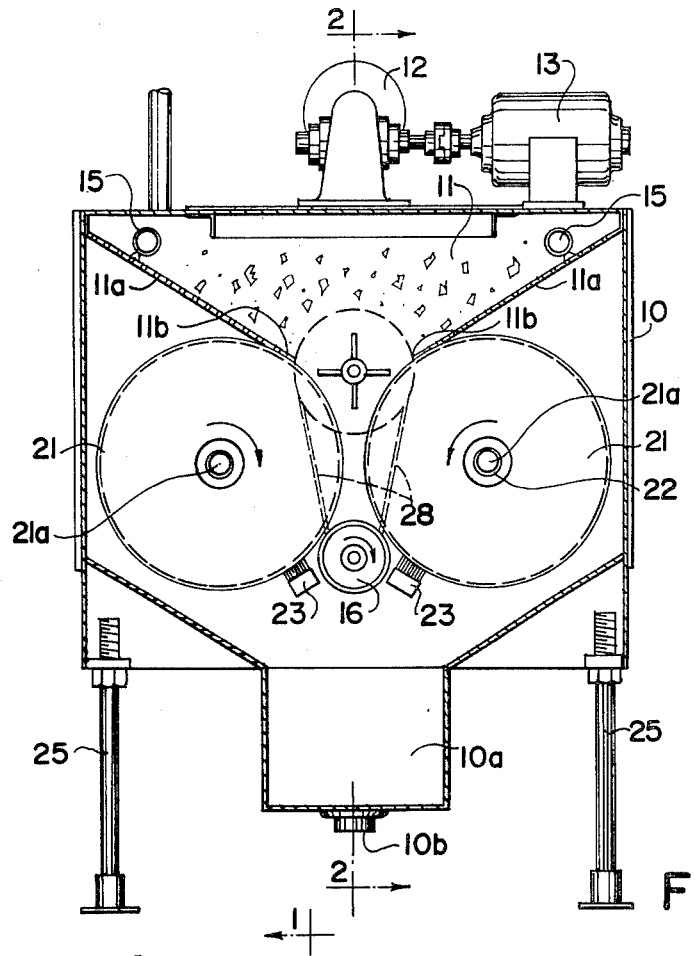
FIG. 1 is a sectional view taken along the line 1—1 of FIG. 2.

An embodiment of this invention is described which is designed for use with a bottle washing machine having a plurality of tanks in each of which bottles are washed in a solution of caustic soda so that the tank becomes filled with pieces of the paper labels floating in the caustic soda bath. This invention transports this mixture of caustic soda and paper labels by pump to a housing 10 which has generally imperforate sides and bottom, together with a reservoir 11 in the upper part of the housing to receive a quantity of a mixture of caustic soda and the pieces of paper transported from the bottle washing machine to the reservoir 11 by means of a pump 12 driven by the electric motor 13. The reservoir 11 has a sloping bottom 11a which is provided with a multitude of perforated openings about 1/16 inch in diameter. The bottom slopes toward the center and terminates at edges 11b which form an elongated rectangular opening at the center location. Means is provided for agitating the contents of the reservoir 11 by means of rotatable paddles 14 which are rotated by means of a chain sprocket 15a as will be later described. Means is provided for flushing the sloping bottom of the reservoir toward the center and this is shown at the elongated water spray pipes 15 placed in the housing so as to spray water upon the upper edges of the inclined bottom surfaces.

Figure 6:
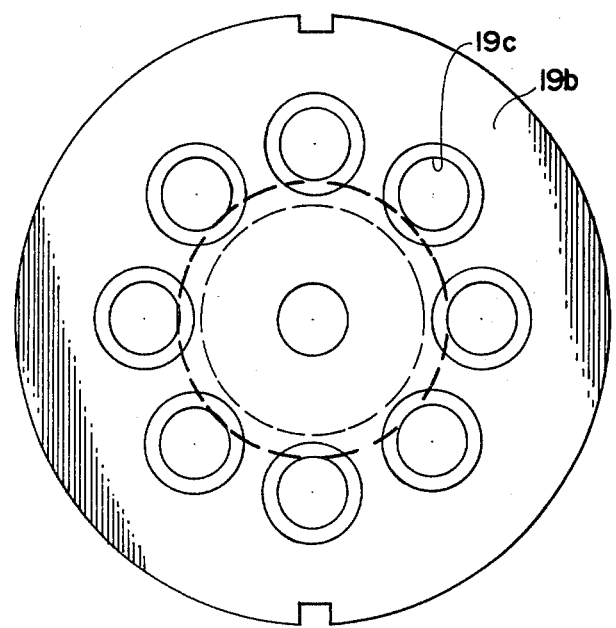

An elongated helical screw conveyor 16 is mounted in the housing spaced below and parallel to the elongated opening of the edges 11b of the reservoir central opening. Means is provided for driving the conveyor 16 to move its contents toward the left as viewed in FIG. 2, and this comprises a chain sprocket 17 for which the driving means will be explained later. A perforated conveyor sleeve 18 closely surrounds the conveyor on the bottom and sides leaving an open top 18a to receive paper coming down from above. A label chopper 19 is provided at the lefthand end of FIGS. 2 and 3 where the conveyor discharges paper outside of the housing 10. This chopping device includes rotatable chopping knives 19a mounted on the squared end 20a of the conveyor drive shaft 20. These knives cooperate with a label chopping plate 19b which, as shown in FIG. 6, has a plurality of truncated conical openings 19c which present sharp cutting edges toward the knives 19a so as to chop the label portions into small bits of paper.

Two cylindrical drums 21 are mounted in the housing 10 for intermittent rotation on axes 21a parallel to the screw conveyor 16 and spaced intermediate the level of the elongated opening at 11b and the level of the screw conveyor 16 and spaced equally on opposite sides of a central line between such rectangular opening and the conveyor leaving space in the center between the two drums for the paper pieces to fall downwardly. Preferably, the drums have imperforate circular heads at the opposite ends and cylindrical peripheries of stainless steel screen providing the surfaces of the two drums. The perforations in these drum surfaces are preferably about 1/16 inch in diameter all over the surfaces of the drums.

Figure 2:
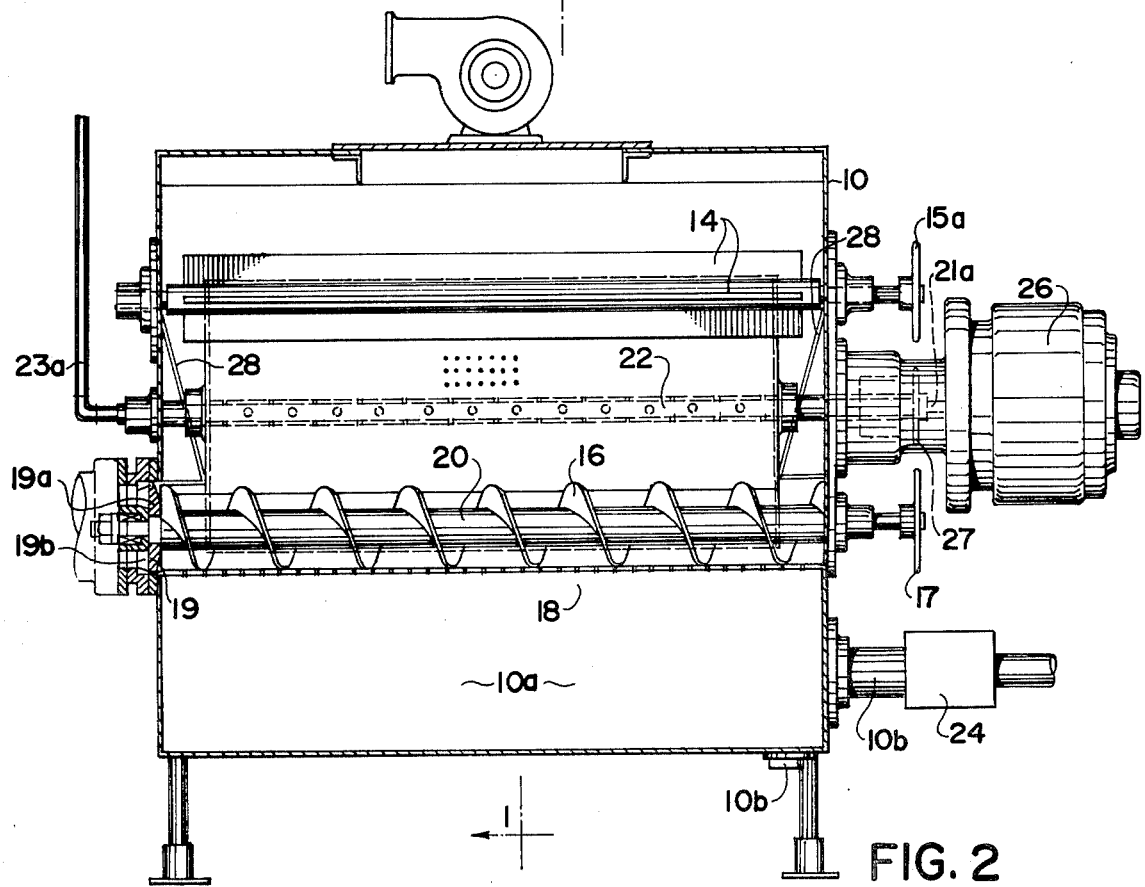
FIG. 2 is a sectional view of the same taken along the line 2—2 of FIG. 1.
Figure 3:
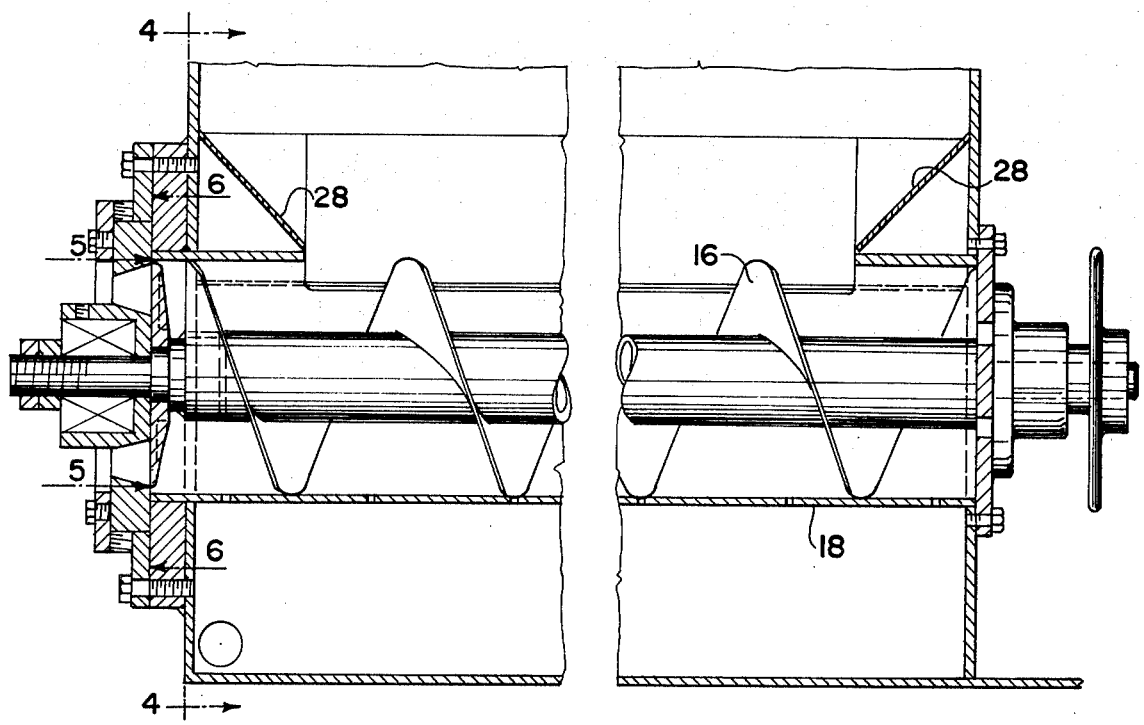
FIG. 3 is a fragmental sectional view enlarged showing the lower lefthand portion of FIG. 2.
Figure 4:
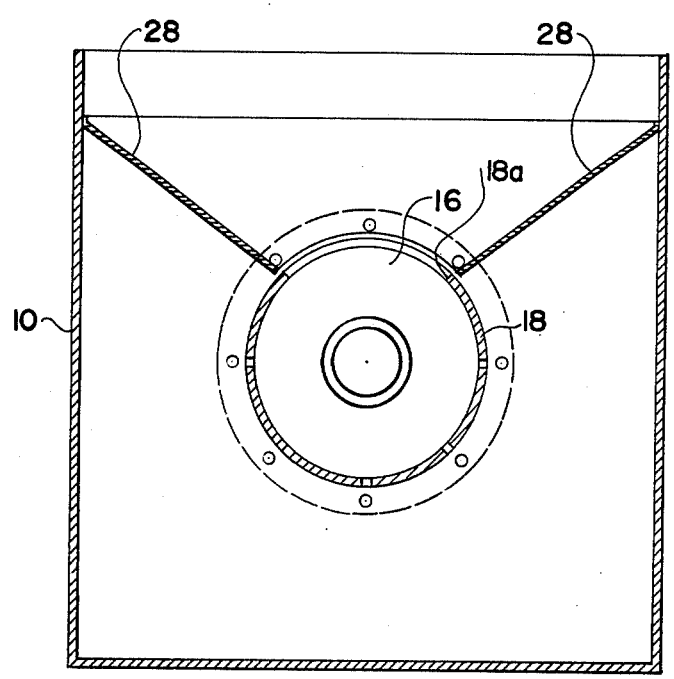
Figure 5:
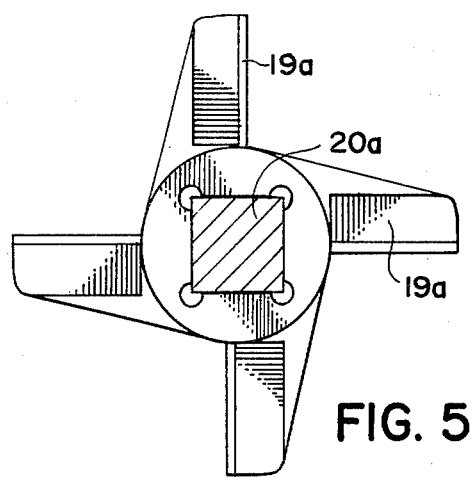
FIGS. 5 and 6 are views taken respectively along the lines 5—5 and 6—6 of FIG. 3.

Means is provided on the interior of the drums for flushing off paper particles collected on the outer surface of the drums. This is shown in FIGS. 1 and 2 as lengths of stainless steel tubing about two inches in outside diameter and ⅛ inch wall thickness together with ¼ inch holes spaced along the tubing as illustrated in FIG. 2. Spray water is supplied under pressure to the tubing 22 through the water line 23a shown in FIG. 2. Stiff brushes 23 are mounted in the housing 10 by means not shown so as to engage firmly each of the drum peripheries for the full length, close to the screw conveyor 16, to remove paper particles which may cling to the outer peripheries of the drums.

During operation of the pump 12 the mixture of caustic soda and pieces of paper labels pass through the housing separating the labels and allowing the caustic soda to pass through the housing to the bottom portion 10a which is provided with an outlet 10b through which the caustic soda is pumped back to the washing machine tank through a filter 24.

The housing 10 is supported on a floor or the like surface by means of four adjustable legs 25.

Two electric motors 26 are mounted on a housing 10 one opposite each of the drum drive shafts 21a and drivingly connected thereto. One of these motors 26 drives a chain sprocket 27 and suitable chain connections drive the sprockets 15 and 17 which were previously described.

Suitable baffles 28 are provided where ever necessary to ensure that all of the caustic soda and pieces of paper travel downwardly through the housing 10 to the lower portion 10a.

In operation of the equipment just described, the pump 12 is operated to withdraw the contents of one of the tanks of a bottle washing machine in which is collected loose paper pieces in a bath of caustic soda. This material is discharged into the upper reservoir 11 of the housing 10 as seen in FIG. 1 and the caustic soda passes down through the perforations in the sloping bottom 11a and, when the caustic soda solution has substantially flowed through to the bottom 10a of the housing, the paper particles and pieces as agitated by the paddles 14 and as washed down the sloping bottom walls 11a by the sprays at 15, will have passed down to the screw conveyor 16 and so out through the label chopper 19. Control means, not shown, will then be operated to cause the motor means 26 to rotate the two drums 21 in the direction of the arrows as shown in FIG. 1 and at the same time, the brushes 23 will brush the paper off the peripheral walls of the drums 21. During the same period of time, the spray water is supplied under pressure to the tubing 22 to remove paper particles which may cling to the outer peripheries of the drums 21. During the same period of time, the conveyor screw 16 is rotated by power supply to the sprocket wheel 17 so as to carry the paper particles and pieces through the chopper 19a. The caustic soda collected at the bottom of the housing 10 is then transported by pump, not shown, back to a tank at the bottle washing machine, or to any other desired location.

What is claimed is:

1. Apparatus for separating loose paper pieces from a bath of caustic soda comprising a housing having generally imperforate sides and bottom, a reservoir in the upper part of said housing to receive a quantity of a mixture of caustic soda and pieces of paper, said reservoir having a bottom with perforated openings about 1/16 inch in diameter, said bottom sloping toward the center and having terminating edges in an elongated opening at the center, means for agitating the contents of said reservoir, means for flushing said sloping bottom toward the center, an elongated helical screw conveyor in said housing spaced below and parallel to said elongated opening discharging outside of said housing, means for driving said conveyor when desired, a perforated conveyor sleeve closely surrounding said conveyor on the bottom and sides leaving an open top, two cylindrical drums mounted in said housing for intermittent rotation on axes parallel to said screw conveyor and spaced intermediate the level of said elongated opening and the level of said screw conveyor and equally on opposite sides of a line between said opening and said conveyor, and there being a slight clearance between each of said drums and said terminating edges of said reservoir bottom and also between said drums and the longitudinal sides of said open top of said conveyor sleeve, said drums providing a space between their peripheries, and means for removing caustic soda from the bottom of said housing, whereby a mixture of caustic soda and pieces of paper may be pumped into said reservoir and caustic soda is filtered through said perforated bottom of said reservoir and intermittingly said conveyor may be started and said drums rotated to propel paper from said reservoir to said conveyor and thence outside of said housing, thus recovering caustic soda for reuse.

2. Apparatus as defined in claim 1, wherein said drums have imperforate circular heads and cylindrical peripheries of perforated stainless steel screen.

3. Apparatus as defined in claim 2, including brushes rigid with said housing engaging each of said drum peripheries close to said screw conveyor.

4. Apparatus as defined in claim 2, including a perforated spray flushing pipe extending axially of each drum, and a pressure liquid supply communicating with each pipe.

5. Apparatus as defined in claim 1, including a rotatable paper cutter located axially of said screw conveyor where it discharges from said housing.

* * * * *